Figure 3:
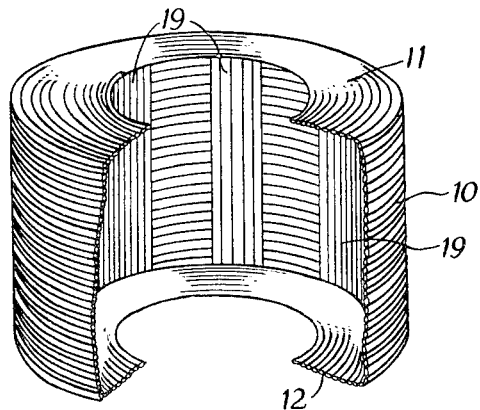

Oct. 12, 1965  L. U. R. ZUCCHI  3,211,906
LAMPSHADES, DIFFUSERS AND THE LIKE
Filed July 5, 1962  2 Sheets-Sheet 1
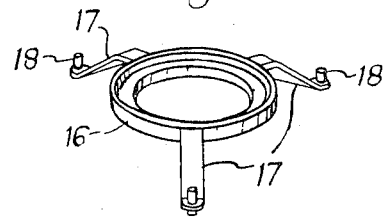
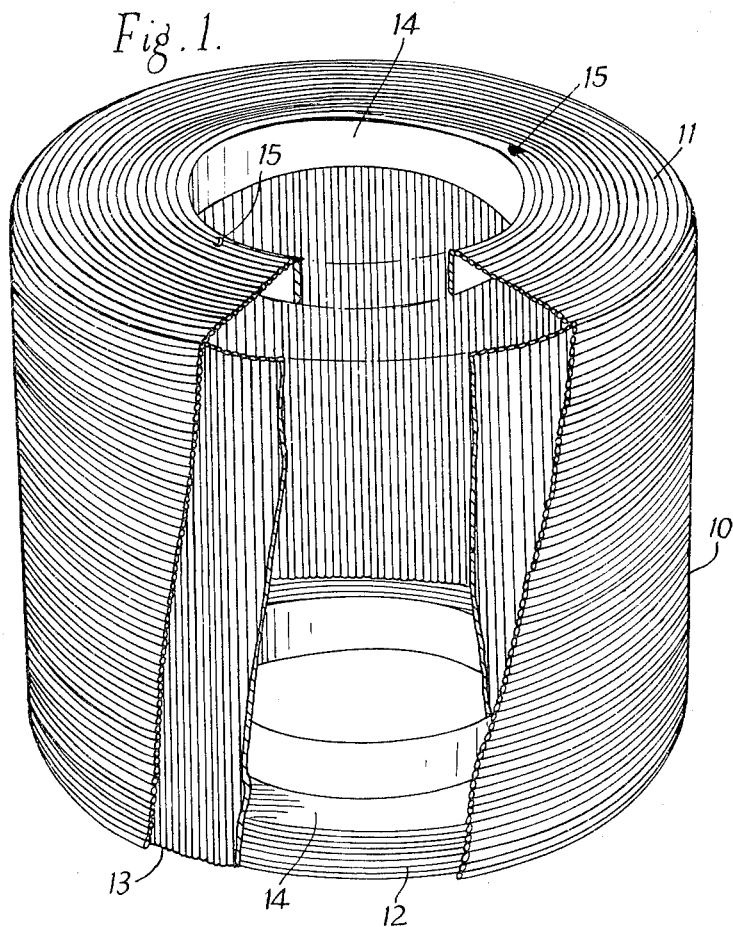
INVENTOR
LUCIANO U.R. ZUCCHI
BY Morris + Bateman
ATTORNEYS

INVENTOR
LUCIANO U. R. ZUCCHI
ATTORNEYS

United States Patent Office 3,211,906
Patented Oct. 12, 1965

3,211,906
LAMPSHADES, DIFFUSERS AND THE LIKE
Luciano U. R. Zucchi, London, England, assignor to Rotaflex of Canada Limited, Toronto, Ontario, Canada, a corporation of Great Britain
Filed July 5, 1962, Ser. No. 207,606
Claims priority, application Great Britain, Mar. 19, 1962, 10,511/62
4 Claims. (Cl. 240—108)

This invention relates to sheet material suitable for use in the manufacture of lampshades, diffusers and other articles intended to transmit, diffuse or reflect light, and is designed to provide a material which has a pleasing or decorative appearance.

According to the invention, the sheet material comprises a series of strips, rods, wires, bands or the like, either solid or tubular, and which will be referred to generally as "filaments," disposed parallel side by side, juxtaposed filaments being secured to one another to form a first layer, and a second layer formed in similar manner to the first layer and secured to one side of the first layer, the filaments of the second layer being disposed at an angle relatively to the filaments of the first layer, and at least some of the said filaments of each layer being transparent or translucent. The two layers forming the composite sheet may be co-extensive, or one layer may be discontinuous, that is, the discontinuous layer may have openings therein, or strips of one layer may be secured on one side of the other layer, the said strips being spaced apart in any desired formation. As stated above, the filaments of one layer are disposed at an angle to those of the other layer. For example, the filaments of the two layers may be disposed at right angles to one another, but they may be disposed at any other desired angle. It will be appreciated that when a light is transmitted through such a composite sheet, the pattern or decorative effect will depend upon the relationship between transparent, translucent and opaque filaments in each layer and the angle at which the filaments of one layer cross the filaments of the other layer.

In a simple arrangement, by way of example, each layer comprises alternate transparent and opaque filaments, the filaments of one layer being arranged at right angles to those of the other layer, and the two layers being co-extensive. This simple arrangement will form a simple check pattern when light is transmitted through the composite sheet. However, it will be apparent that a very large number of different arrangements and combinations of different layers can be made, and it will be possible to give only a general indication to such arrangements. As stated above, one layer or each layer may comprise alternate opaque and transparent filaments, this being a very simple arrangement, but a layer may comprise an arrangement of opaque, translucent, and transparent filaments, the translucent and/or transparent filaments having different degrees of light transmission and/or may be of different colours. It will therefore be seen that the pattern arrangement for each layer enables a large number of patterns to be provided or formed, and the patterns of the two layers can be either the same or different, and that further variations can be effected by, for example, providing gaps in one layer, or by making one layer or each layer from strips which themselves have different pattern arrangements of their filaments.

The invention is capable of still more complex pattern arrangements by having three or more layers, and each layer may be varied in the manner indicated above.

The filaments may be made of any convenient material or materials, and this may depend upon the particular pattern arrangement to be produced, or the purpose for which the sheet material is to be used. Thermoplastic materials are suitable for many purposes, and conveniently the filaments may be formed either as solid filaments or as tubular filaments by an extrusion process. This is particularly suitable for various reasons, for example, the filaments can be made in any desired cross-sectional shapes, and filaments of most thermoplastic materials can readily be caused to adhere to one another as required for forming a layer of composite sheet of the present invention. Plastics of cellulose acetate type are suitable, and filaments can be extruded in a wide range of colours, either transparent, translucent or opaque. The cross-sectional shape of the filaments may be simple shapes such as circular or rectangular, but they may be such as to enable adjoining filaments to interengage or interfit with one another whereby they can be more firmly adhered to one another. For example, each filament may be so shaped in cross-section that one side is convex and the opposite side is concave so that the convex side of one filament will fit closely in the concave side of an adjoining filament. Adhesion of adjoining filaments, irrespective of their cross-sectional shapes, may be effected in any convenient manner, for example by the application of an adhesive or glue, or a solvent for the material of the filaments, or by the application of heat to thermoplastic filaments whilst they are held in position side by side to form a layer to be eventually incorporated in a composite sheet. An alternative method comprises extruding the filaments from a series of nozzles disposed side by side in line, so that each filament as it issues from its nozzle is in contact with the filaments issuing from adjoining nozzles, and the filaments will adhere to one another as setting of the material takes place.

The composite sheet material may be made as a flat sheet that can be cut to size and shape for use as panels for a variety of purposes, or can be curved or deformed by any convenient procedure such as the procedures employed in forming thermoplastic sheet materials into hollow or concave articles, for example by means of moulds and the application of heat and pressure. Articles such as lampshades or component parts of lampshades can be made in this way.

Instead of forming the composite sheet as a flat sheet, it can be formed directly as a hollow article such, for example, as a lampshade or a container such as bowl or a waste paper basket. For this purpose one layer of a hollow article can be formed by helically winding a filament, or two or more filaments side by side, around a core or mould corresponding in shape with the desired shape of the finished article, and during or subsequent to the winding operation causing the adjoining filaments to adhere to one another, for example, by the application of an adhesive, or a solvent, or heat. A second layer can be wound over the first layer, but with the filaments disposed at an angle to those of the first layer, and the two layers caused to adhere to one another at one or more places. Alternatively, the first layer may be formed by helically winding on a core as described above, and the second layer may be formed from a flat sheet layer as previously described, by deforming the said flat sheet so that it will fit closely within the first layer, the second layer having its filaments disposed at an angle to those of the first layer. In a further alternative, the second layer may comprise strips cut from a flat sheet layer, the strips being then secured on the inside of the shaped first layer.

Figure 4:
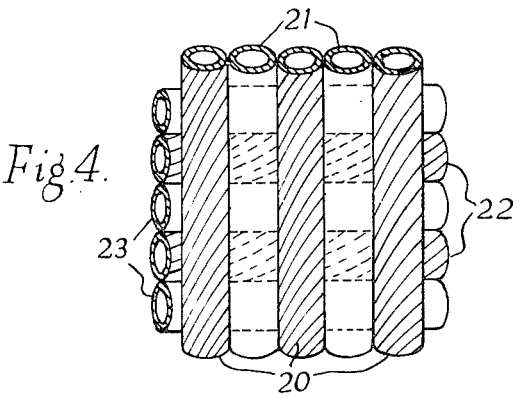

A lampshade manufactured in accordance with the invention together with a modification and one arrangement of sheet material will now be described, by way of example only, with reference to the accompanying drawings, in which:

FIGURE 1 is a perspective view of a lamp shade, partly broken away to illustrate the construction, FIGURE 2 illustrates a member for supporting the lampshade of FIGURE 1 on a lampholder, FIGURE 3 is a diagrammatic view of a lamp shade similar to that of FIGURE 1 but illustrating a modification, and FIGURE 4 is a diagrammatic representation drawn to an enlarged scale, of a small part of a flat sheet made according to the invention.

Referring to FIGURE 1 of the drawings, the lampshade illustrated is substantially cylindrical with annular top and bottom walls, in other words it is substantially cylindrical with an inwardly directed flange at the top and a similar inwardly directed flange at the bottom. The outer layer, comprising a cylinder 10 with two inwardly directed flanges 11 and 12, is formed by helically winding filaments over a core as described above. The inwardly directed flange portion 11 is made from a filament of translucent thermoplastic material side by side with a transparent filament, and the winding of these side by side filaments is continued for the cylindrical portion 10. The filaments are caused to adhere to one another by the application of a solvent, or an adhesive, as the filaments are being wound on the core. The component 10, 11 so formed is then removed from the core. The inner layer 13 comprises a rectangular piece cut from a sheet comprising alternate transparent and translucent filaments. This single layer piece is bent into a cylinder with the filaments disposed axially, and of a diameter to fit closely within the outer cylinder 10. The adjoining ends of the said piece are secured together by adhesive or solvent, and the cylinder so formed is fitted within the outer cylinder 10, and secured in position by applying adhesive or solvent in an annular path around either the inside of the outer cylinder 10 or the outer side of the inner cylinder 13. The flange member 12, which is slightly concave or dished, is formed in the same manner as the flange portion 11 by winding side by side alternate transparent and translucent filaments. An annular strengthening member 14 of L cross-section is fitted at the inner edge of each of the flange portions 11 and 12. The procedure for fitting the members 14 is to fit the member 14 on the core or mould, the member 14 having holes 15 into which the ends of the filaments are secured, and then feeding the filaments as the core with the member 14 are being rotated. The filaments will be caused to adhere to the member 14 by the adhesive or plasticiser applied to the filaments to cause them to adhere to one another. The periphery of the member 12 is then secured to the free edge of the composite cylinder 10, 13 with adhesive or a solvent. When the lampshade is in use, it will have a check pattern, shafts of light passing through the places where the transparent filaments of the two layers cross one another, which provides a sparkling effect.

It will be appreciated that the cylindrical portion 10 may have a different combination of filaments than the flange portions 11 and 12. For example, during winding of the portions 10 and 11, an additional filament such as an opaque filament may be fed at the intersection between the portions 10 and 11, the opaque filament being then fed alongside one of the other filaments throughout the winding of the cylindrical portion 10. The inner cylinder 13 may also have a different combination of filaments, but usually it will have a similar pattern or alternation of filaments as the outer cylinder 10.

Any convenient means may be provided for supporting the lampshade from a lamp holder. One device for this purpose is shown in FIGURE 2 and comprises an annular member 16 having three equally spaced radially projecting arms 17, each arm having an upturned end 18 for engagement with the lower edge of the vertical portion of a member 14, and the annular portion 16 being adapted to fit over and be secured on a lampholder in the usual manner.

An alternative arrangement for a lampshade is shown in FIGURE 3, in which, instead of the inner layer being a complete cylinder, it comprises separate strips 19 secured on the inside of the outer layer 10, with the filaments disposed axially, the several strips 19 being spaced apart around the cylindrical outer layer 10.

Other types of lampshades or diffusers, such as bowl-shaped diffusers can be formed in a similar fashion, the outer layer being formed by helically winding the filaments around a core, and the inner layer being made either by securing strips cut from a sheet made of a series of parallel filaments secured together side by side, the strips being secured in position to one surface of the lampshade or bowl-like diffuser with their filaments at an angle to those of the lampshade or diffuser.

In FIGURE 4 there is illustrated, on an enlarged scale, a portion of sheet material having two layers, each layer being formed from side-by-side filaments and the filaments of the two layers being disposed at an angle to one another. In FIGURE 4, the filaments are tubular and a very simple arrangement of the filaments is shown. The uppermost layer comprises alternate opaque filaments 20 and transparent filaments 21. Similarly the lower layer comprises alternate opaque filaments 22 and transparent filaments 23. The filaments 20 and 21 are disposed at right angles to the filaments 22 and 23, thus providing a simple check pattern. As previously stated, there are a very large number of different arrangements or combinations for the filament of each layer, employing opaque, translucent or transparent filaments, any of which can be of any desired colour. These different pattern arrangements can be applied either to sheet material or to an article such as a lamp shade or other hollow article. Furthermore, one layer of the composite sheet material may be discontinuous, that is, it may comprise spaced-apart strips similar to the strips 19 of FIGURE 3.

I claim:

1. In a lampshade having an annular shade portion and means for mounting said shade portion on a lamp support in surrounding relation to a light source, said shade portion comprising two separately formed, surface bonded, annular layers, each of said layers being formed from a series of bonded, side-by-side filaments extending only in substantially parallel relation to each other, said layers being so arranged with respect to each other that the filaments of one layer are oriented at substantially right angles with respect to the filaments of the other layer, at least alternate ones of the filaments in each of said layers being substantially light transparent and the remaining ones of said filaments being relatively translucent.

2. In a lampshade having an annular shade portion and means for mounting said shade portion on a lamp support in surrounding relation to a light source, said shade portion comprising two separately formed, surface bonded, annular layers, each of said layers being formed from a series of bonded, side-by-side filaments extending only in substantially parallel relation to each other, said layers being so arranged with respect to each other that the filaments of one layer are oriented at substantially right angles with respect to the filaments of the other layer, at least alternate ones of the filaments in each of said layers being formed from substantially light transparent material, and the remaining ones of said filaments being opaque.

3. In a lampshade having an annular shade portion and means for mounting said shade portion on a lamp support in surrounding relation to a light source, said shade portion comprising an annular layer formed by a series of side-by-side filaments each bonded to adjacent filaments to define an annular configuration and extending only in substantially parallel relation to each other, a plurality of segmental circumferentially spaced apart layers surface bonded to said annular layer and each being formed by a series of side-by-side filaments each bonded to adjacent filaments and extending substantially only at right angles to the filaments in said annular layer, at least alternate one of said filaments in each of said layers being substantially light transparent and the remaining ones of said filaments being relatively translucent to provide said shade portion with a distinctive light transmitting pattern.

4. In a lampshade having an annular shade portion and means for mounting said shade portion on a lamp support in surrounding relation to a light source, said shade portion comprising an annular layer formed by a series of side-by-side filaments each bonded to adjacent filaments to define an annular configuration and extending only in substantially parallel relation to each other, a plurality of segmental circumferentially spaced apart layers surface bonded to said annular layer and each being formed by a series of side-by-side filaments each bonded to adjacent filaments and extending only substantially at right angles to the filaments in said annular layer, at least alternate ones of said filaments in each of said layers being substantially light transparent, and the remaining ones of said filaments being opaque to provide said shade portion with a distinctive light transmitting pattern.

References Cited by the Examiner

UNITED STATES PATENTS

| | | | |
|---|---|---|---|
| 2,049,251 | 7/36 | Deitsch | 240—108 |
| 2,322,045 | 6/43 | Miller | 240—108 |
| 2,372,878 | 4/45 | Binns et al. | 156—167 |
| 2,574,221 | 11/51 | Modiglioni | 156—167 |
| 2,715,088 | 8/55 | Gunning | 156—167 |
| 2,974,435 | 3/61 | Eschenroeder | 240—108 |
| 3,046,178 | 7/62 | Tupper | 156—167 |
| 3,084,087 | 4/63 | Weil et al. | 240—108 X |

FOREIGN PATENTS

| | | |
|---|---|---|
| 71,511 | 9/50 | Denmark. |
| 753,655 | 4/51 | Great Britain. |
| 93,285 | 2/60 | Netherlands. |

NORTON ANSHER, *Primary Examiner.*

JOSEPH D. BEIN, *Examiner.*